(12) United States Patent
Velez et al.

(10) Patent No.: US 6,215,818 B1
(45) Date of Patent: Apr. 10, 2001

(54) METHOD AND APPARATUS FOR OPERATING AN ADAPTIVE DECISION FEEDBACK EQUALIZER

(75) Inventors: Edgar Velez, Kanata; Ian Dublin, Ottawa, both of (CA); Richard Buz, Rohnent Park, CA (US); Sisay Yirga, Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/069,400

(22) Filed: Apr. 29, 1998

(51) Int. Cl.$^7$ ..................................................... H03H 7/30
(52) U.S. Cl. ............................................. 375/233; 375/261
(58) Field of Search ................................. 375/229, 232, 375/233, 235, 261, 278, 284, 285, 279, 316, 320, 348; 364/724.2, 724.011, 724.19

(56) References Cited

U.S. PATENT DOCUMENTS

| 5,541,956 | | 7/1996 | Ueda ..................................... 375/232 |
| 5,581,585 | * | 12/1996 | Takatori et al. ...................... 375/376 |
| 5,671,253 | * | 9/1997 | Stewart ................................. 375/316 |
| 5,675,612 | * | 10/1997 | Solve et al. .......................... 375/326 |
| 5,684,832 | * | 11/1997 | Adachi et al. ........................ 375/355 |
| 5,689,528 | | 11/1997 | Tsujimoto ............................. 375/233 |
| 5,694,423 | | 12/1997 | Larsson et al. ....................... 375/231 |
| 5,799,037 | * | 8/1998 | Strolle et al. ......................... 375/233 |
| 5,809,065 | * | 9/1998 | Dapper et al. ........................ 375/262 |
| 5,835,541 | * | 11/1998 | Namekata et al. .................... 375/216 |
| 5,886,748 | * | 3/1999 | Lee ....................................... 348/614 |
| 5,970,093 | * | 10/1999 | de Lantremange ................... 375/234 |
| 6,002,713 | * | 12/1999 | Goldstein et al. .................... 375/222 |
| 6,026,120 | * | 2/2000 | Betts .................................... 375/261 |
| 6,081,822 | * | 6/2000 | Hillery et al. ........................ 708/445 |

* cited by examiner

Primary Examiner—Chi Pham
Assistant Examiner—Emmanuel Bayard
(74) Attorney, Agent, or Firm—Pearne & Gordon LLP

(57) ABSTRACT

A method of estimating signal-to-noise ratio at an output of an adaptive decision feedback equalizer receiving an input signal. The method of SNR estimation includes (a) calculating an average output error of the equalizer; and (b) estimating the signal-to-noise ratio (SNRest=$k_n$−20 log$_{10}$ (Eavg)) where $k_n$ is a constant based on a QAM index n and Eavg is the average output error of the equalizer. The estimated SNR can be used to detect proper equalizer convergence by comparing the estimated SNR to an SNR threshold (e.g. lowest SNR for a 4QAM signal), wherein the equalizer is not properly converged when the estimated SNR is lower than the SNR threshold. The estimated SNR can also be used to adjust the operating QAM index of the equalizer by comparing the estimated SNR to an ideal SNR based on an objective bit error rate for a prescribed QAM index, and reconverging the equalizer at a QAM index lower than the prescribed QAM index when the estimated SNR is lower than the ideal SNR.

11 Claims, 4 Drawing Sheets

METHOD AND APPARATUS FOR OPERATING AN ADAPTIVE DECISION FEEDBACK EQUALIZER

FIELD OF THE INVENTION

This invention relates to the field of modem equalizer operation, and in particular to methods and apparatus for estimating equalizer output signal-to-noise ratio, detecting proper equalizer convergence and selecting an appropriate operating QAM index of a equalizer.

BACKGROUND OF THE INVENTION

In communication systems a modem is used to convert (modulate) digital signals generated by a computer into analog signals suitable for transmission over telephone lines. Another modem, located at the receiving end of the transmission, converts (demodulates) the analog signals back into digital form. In a particular modulation transmission scheme, the phase and amplitude of a signal are shifted to various combinations of values, each combination indicating a different set of transmitted bits. At the receiver, proper decoding includes detecting the various phase and amplitude combinations.

In a two dimensional modulation scheme, the signal can be represented mathematically with an I (in-phase) component and a Q (quadrature-phase) component of the signal, each of which is $\pi/2$ out of phase with respect to the other. The plot of these two components on a two dimensional graph for a set of received symbols results in a pattern referred to as a constellation.

Proper detection of the I and Q components of the signal is hampered by various sources of signal degradation. One such source is intersymbol interference where consecutive transmitted symbols interfere with each other. Other sources of signal degradation include the transmission media (i.e. wire) and analog filters. These factors produce large amplitude and group delay distortion in the signal that need compensation.

To compensate for intersymbol interference (ISI) and other sources of signal degradation and distortion, best performance is achieved by implementing an equalizer as a fractionally spaced adaptive filter. An adaptive filter can modify from time instant to time instant, the coefficients, also referred to as tap weights, used in the filter to remove ISI and to compensate for amplitude and group delay distortions. The update of the tap weights is done to minimize the error between the output of the filter and its sliced value (i.e. the nearest constellation point). This error is effectively a measure of the difference between the actual output of the filter and the expected output. The adaptive process continues until the error is at a minimum (i.e. the filter converges).

The quality of convergence of an equalizer depends on many factors including the number of taps, initial tap weights, desired convergence rate, signal to noise ratio (SNR) at the input and phase changes caused by a timing recovery circuit at the receiver, and can be accomplished with various adaptive algorithms.

The adaptation of the tap weights in adaptive equalizers is based on an assumed correct decision about which symbol was received. This assumption is valid for equalizers with a training sequence for which the received symbol is in fact known in advance. Equalizers, however, are also used without the benefit of a training sequence, in which case the decision is not necessarily correct. These equalizers are referred to as blind equalizers. The term blind refers to trying to find the correct equalizer coefficients without a reference training sequence, therefore during convergence the decisions may be incorrect and the coefficients (weights) erroneously updated. Although the possibility of a mistake misconvergence exists, if the blind equalizer makes correct decisions for a sufficiently large set of received symbols, the equalizer will converge correctly.

Traditionally, SNR is measured at the receiver input by measuring the power spectral density in-band versus the power spectral density out-of-band to give an estimate of SNR in-band. This is normally performed at a particular point in the receive path before the equalizer. The problem, however, is that traditional SNR estimation does not accurately predict the noise in-band. In addition, the signal presents typically a slope within its bandwidth. After the equalizer, the slope gets compensated, but the noise within the signal bandwidth gets enhanced, thereby decreasing the SNR. As a result, traditional SNR estimation methods cannot be used to accurately detect misconvergence or to predict the output SNR of an equalizer.

SUMMARY OF THE INVENTION

An object of the present invention is to provide a method and apparatus for estimating output signal-to-noise ratio of a modem equalizer.

An object of the present invention is to provide a method and apparatus for improving proper convergence detection in a modem equalizer.

Another object of the present invention is to provide a method and apparatus for selecting an appropriate operating QAM index in a modem equalizer.

In accordance with an aspect of the present invention there is provided a method of convergence monitoring in an adaptive decision feedback equalizer having a quadrature amplitude modulation (QAM) slicer receiving as input a complex input signal, comprising the steps of: (a) calculating an average output error of the equalizer; (b) estimating a signal-to-noise ratio (SNR) based on the average output error; and (c) comparing the estimated SNR to an SNR threshold, wherein the equalizer is not properly converged when the estimated SNR is lower than the SNR threshold.

In accordance with another aspect of the present invention there is provided a method of detecting misconvergence in an adaptive decision feedback equalizer having an average output error, comprising the steps of: (a) estimating a signal-to-noise ratio (SNR) based on the average output error; and (b) determining if the estimated SNR is lower than an SNR threshold indicating misconvergence of the equalizer.

In accordance with another aspect of the present invention there is provided a method of operating an adaptive decision feedback equalizer having an average output error, comprising the steps of: (a) estimating a signal-to-noise ratio (SNR) based on the average output error; and (b) comparing the estimated SNR to an ideal SNR based on an objective bit error rate for a prescribed QAM index, and reconverging the equalizer at a QAM index lower than the prescribed QAM index when the estimated SNR is lower than the ideal SNR.

In accordance with another aspect of the present invention there is provided a method of estimating signal-to-noise ratio at an output of an adaptive decision feedback equalizer receiving an input signal, comprising: (a) calculating an average output error of the equalizer; and (b) estimating the signal-to-noise ratio (SNRest) where, $SNRest = k_n - 20 \log_{10}(Eavg)$ where $k_n$ is a constant based on a QAM index n and Eavg is the average output error of the equalizer.

In accordance with another aspect of the present invention there is provided an apparatus for convergence monitoring in an adaptive decision feedback equalizer having a quadrature amplitude modulation (QAM) slicer receiving as input a complex input signal having an in-phase and a quadrature component, comprising the steps of: (a) means for calculating an average output error of the equalizer; (b) means for estimating a signal-to-noise ratio (SNR) based on the average output error; and (c) a comparator for comparing the estimated SNR to an SNR threshold, wherein the equalizer is improperly converged when the estimated SNR is below the SNR threshold.

BRIEF DESCRIPTION OF THE DRAWINGS

The present invention will be described in conjunction with the drawings in which.

DETAILED DESCRIPTION OF EMBODIMENTS OF THE INVENTION

Figure 1:
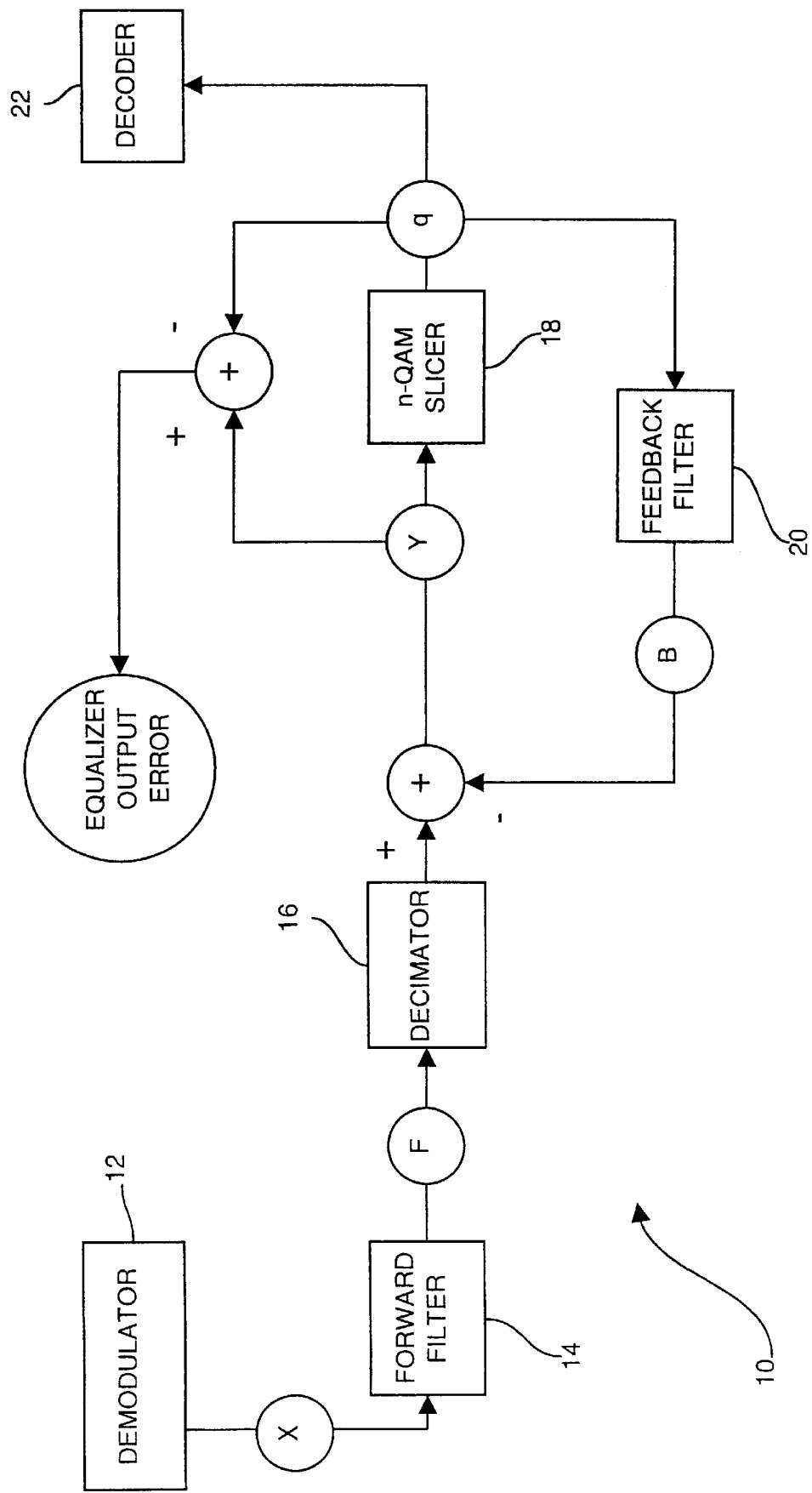
FIG. 1 illustrates a block diagram of an adaptive decision feedback equalizer.

An equalizer 10, shown in FIG. 1, is used to counteract effects of amplitude and phase distortion introduced by a channel and analog front end of a receiver in a modem. The input X=I+jQ to the equalizer 10 is a complex input taken from the output of Nyquist filters located in a demodulator 12, which is first downsampled by a factor of 2 to provide in-phase (I) and quadrature (Q) datastream signals at twice the symbol rate (i.e. symbol rate=inverse of the baud rate of the modem).

The input X is passed through a complex-valued forward filter 14 to produce an output F. The output F of the forward filter 12 is downsampled by decimator 16 by a factor of 2, resulting in a symbol rate data sequence. Quantized output q from an n-QAM slicer 18 is used as input to a complex-valued feedback filter 20 to produce an output B. The output B of the feedback filter 28 is subtracted from the downsampled output (decimated) of the forward filter 10 resulting in an equalized signal Y.

The equalized signal Y is then passed through the n-QAM slicer 18, that quantizes each data sample (for each signal component I and Q of X) to a discrete symbol level in a constellation. The constellation represents a plot of the in-phase (I) component and the quadrature (Q) component of the input signal X on a two dimensional graph for a set of received symbols. An actual error signal $e_a$ is defined as the difference between the equalized signal Y and the quantized output q from the slicer 18. The equalizer output error $e_a$ is used to update tap coefficients of the forward filter 14 and the feedback filter 20 once per symbol duration. The quantized output q of the slicer 18 is also sent to a symbol decoder 22 to recover raw data.

The operation of the forward filter 14 is described by the equation:

$$F(t) = \sum_{i=1}^{M} C_{fi} X(t-i)$$

where F(t) represents the complex-valued output of the filter 14 at time t, X(t) is the complex-valued input to the filter 14 at time t, and $C_{fi}$ are the complex-valued filter coefficients (also termed the tag coefficients) for the filter 14. The complex-valued data F(t) is composed of an in-phase (I) component and an quadrature (Q) component.

The operation of the feedback filter 20 is described by the equation:

$$B(t) = \sum_{i=1}^{N} C_{bi} q(t-1-i)$$

where B(t) represents the complex-valued output of the filter 20 at time t, $C_{bi}$ are the complex-valued feedback filter coefficients for the filter 20, and q(t) is the complex-valued quantized output of the slicer 18 at time t.

The slicer 18 accepts the signal Y (representing the I and Q components of the equalized signal) and makes a decision as to which QAM symbol is actually received. In order to quantize the signal to the appropriate level in a constellation, the slicer 18 has a pair of control bits which specify the level of QAM constellation being used.

In general, operation of the equalizer 10 is improved by using the equalizer output error $e_a$ to calculate an average error for three primary functions: (1) to estimate the output SNR of the equalizer 10; (2) to detect proper convergence in the equalizer 10; and (3) to select an appropriate operating QAM index based on the SNR estimate and an objective BER with an associated ideal SNR. The SNR estimate can also be used for other system related decisions, including lowering transmission power if the SNR estimate is better than the ideal SNR for the objective BER.

The ability to estimate the SNR is important, since it permits monitoring of the objective BER to ensure the equalizer 10 is functioning properly (i.e. converged without error) at a given QAM index, and if the equalizer 10 has converged the SNR estimate is used to determine if the equalizer 10 is operating at a sufficiently high SNR and low BER (i.e. low error).

Figure 2:
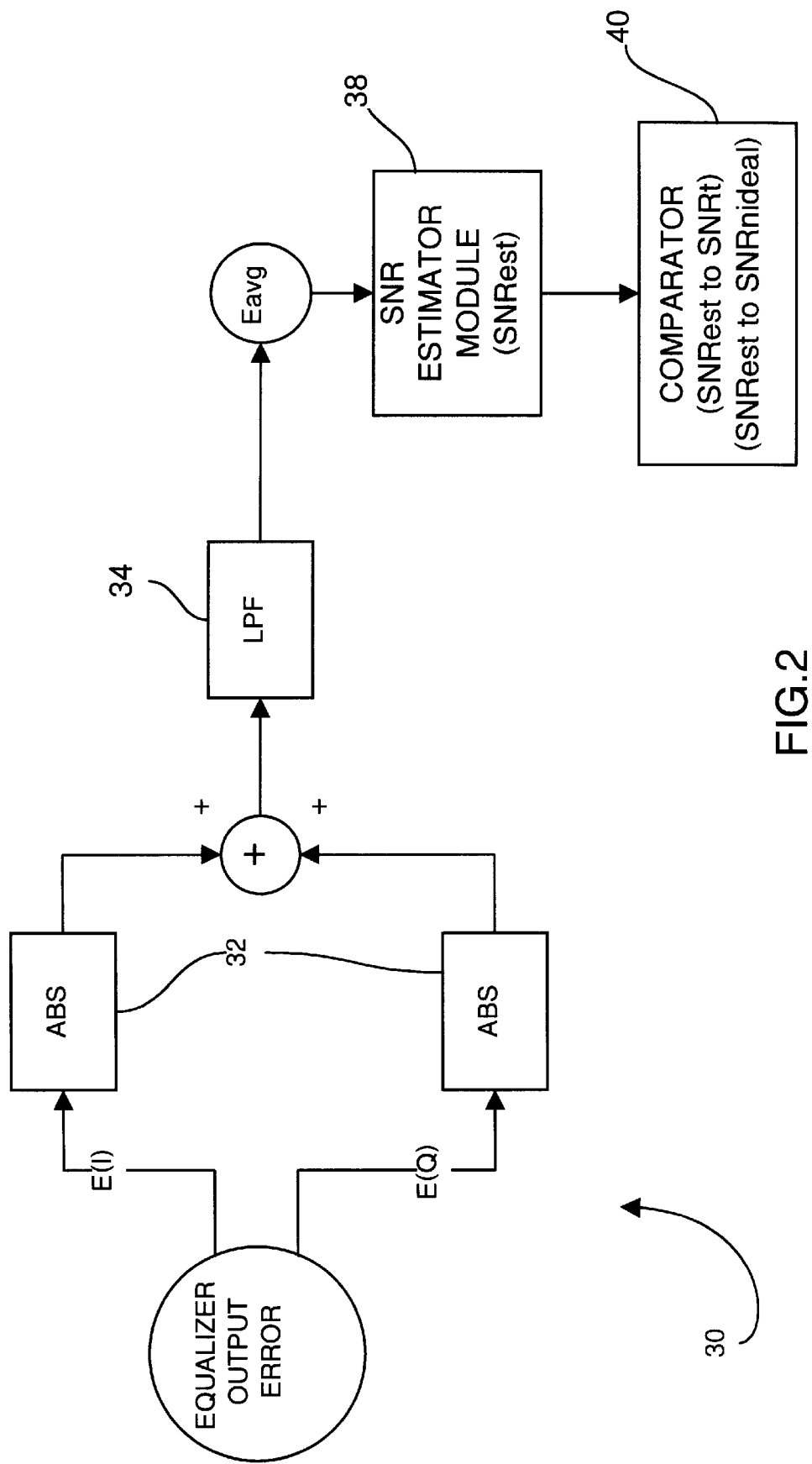
FIG. 2 illustrates a block diagram of the apparatus for SNR estimation, proper convergence detection and operating QAM index adjustment using estimated SNR in the feedback equalizer of FIG. 1 according to the present invention.

An apparatus 30 for misconvergence detection of the equalizer 10 using the SNR of the equalizer 10 is illustrated in FIG. 2. The equalizer output error $e_a$ has an in-phase component E(I) and a quadrature component E(Q). Absolute value filters 32 receive the components E(I) and E(Q) of the equalizer output error $e_a$ and output the respective absolute value: |E(I)| and |E(Q)|.

The absolute value outputs of the error components are added together and integrated by a low pass filter 34 to produce an average error Eavg. The error calculations are performed after a prescribed time period deemed appropriate for having achieved convergence in the equalizer 10. The time period varies based on the QAM index, the operating environment, and convergence rate.

An estimate of the signal-to-noise ratio of the equalizer 10 based on the average error Eavg is calculated in an SNR estimator module 38 using the following equation:

$$\text{SNRest} = k_n - 20 \log_{10}(\text{Eavg}) \qquad \text{Eq. 1}$$

where $k_n$ is a constant for a given QAM index n.

The SNRest is compared to a predetermined SNR threshold (SNRt) in a comparator 40 as a basis for signalling misconvergence when the SNRest value is below a usable signal-to-noise ratio. The SNRt is set at a minimal operating SNR for the lowest operating QAM index of the equalizer 10 (e.g. 4-QAM).

If the estimated SNR (SNRest) is below the threshold SNR (SNRt) (SNRest<SNRt) then the equalizer 10 has not converged properly and reconvergence is accomplished by setting all taps (except one) of the filters 14 and 20 to zero. For example, if the equalizer 10 is operating with 4 QAM signals a signal-to-noise ratio threshold could be selected at 14 dB (SNRt=14 dB). Therefore, if SNRest is higher than or equal to 14 dB then the equalizer 10 is converged.

However, if SNRest falls below 14 dB then the equalizer 10 is not converged properly. In particular, the equalizer 10 can either be misconverged or converged, but operating under poor operating conditions at an unusable SNR.

If the estimated SNR (SNRest) is at least equal to the threshold SNR (SNRt) (SNRest≧SNRt) then a second level check is performed to select an appropriate operating QAM index. Although the equalizer 10 has converged at this point, it is important to ensure that the equalizer 10 is operating at a low bit error rate and at an appropriate QAM index for the achieved SNR-(SNRest). In particular, the SNRest value is used to determine the QAM index to be used to achieve an objective BER (BERobj) as discussed in more detail below.

The SNRest from the estimator module 38 is compared to an ideal SNR (SNRnideal) in the comparator 40. The SNRnideal is based on a given QAM index (n) operating at an objective BER (BERobj). Ideal signal-to-noise ratios can be obtained from known BER/SNR curves for various QAM indexes—an example of such curves for 4, 16, 64, and 256 QAM signals are illustrated in FIG. 3.

Figure 3:
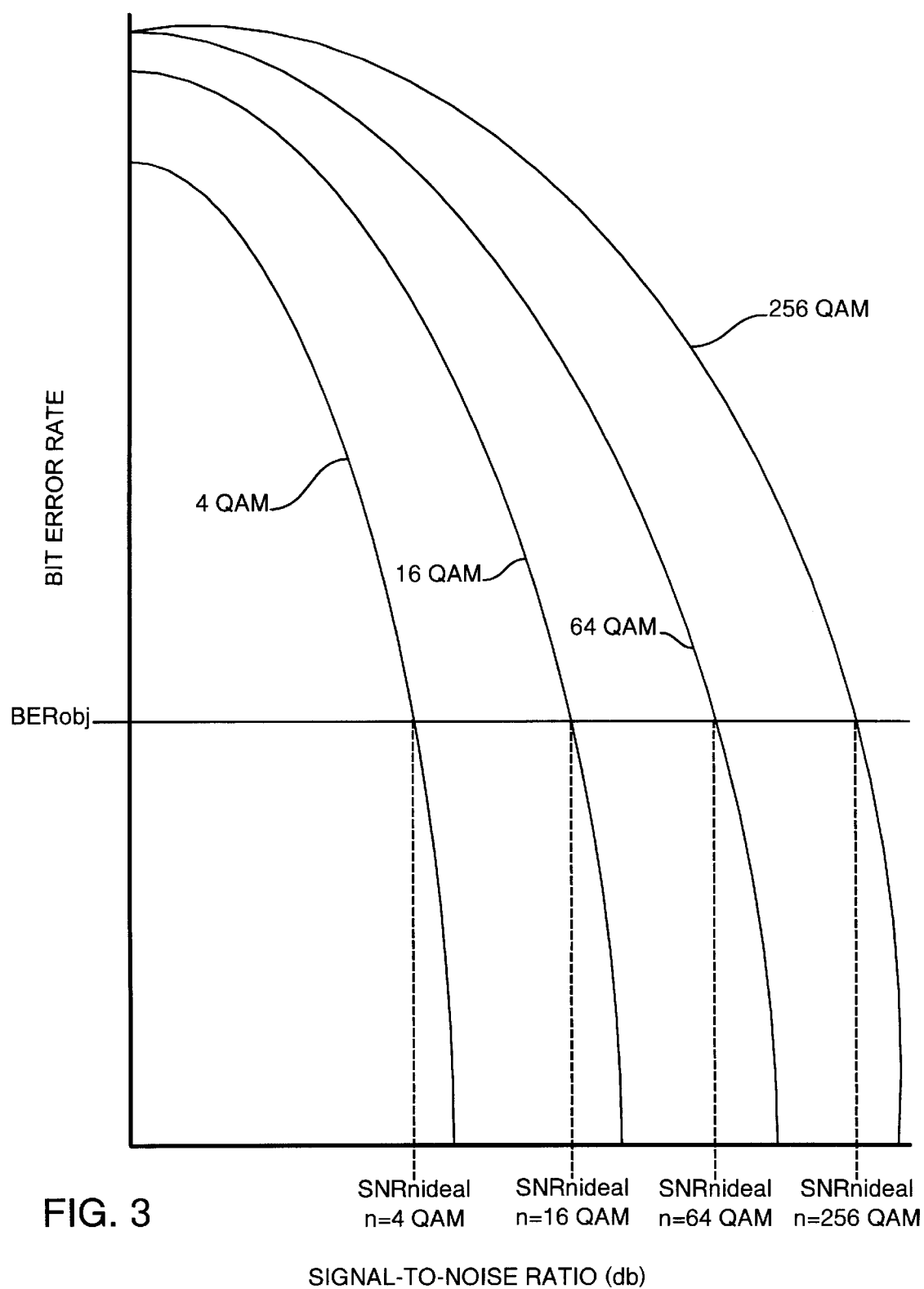
FIG. 3 illustrates a graph of BER versus SNR for a sample of QAM indexes.

The curves of FIG. 3 are not drawn to scale as they are illustrated without specific values only to show the relationship between BER and SNR for various QAM indexes. Table A1 provides an example of two SNRnideal values for each QAM index at two different objective BER levels ($10^{-7}$ and $10^{-8}$).

TABLE A1

| QAM INDEX (n) | OBJECTIVE BER (BERobj) | IDEAL/THRESHOLD SNR (SNRnideal) |
| --- | --- | --- |
| 4 | $10^{-7}$ | ~14 dB |
| 4 | $10^{-8}$ | ~15 dB |
| 16 | $10^{-7}$ | ~22 dB |
| 16 | $10^{-8}$ | ~23 dB |
| 64 | $10^{-7}$ | ~27 dB |
| 64 | $10^{-8}$ | ~28 dB |
| 256 | $10^{-7}$ | ~33 dB |
| 256 | $10^{-8}$ | ~34 dB |

The estimated SNR is compared in the comparator 40 to the ideal threshold SNRnideal selected on the basis of the objective BERobj at the given QAM index.

If the SNRest is below the ideal signal-to-noise ratio (SNRest<SNRnideal) then the equalizer 10 is operating at an SNR that is too low for the operating QAM index and the equalizer 10 is instructed to lower the QAM index (e.g. from 256 QAM to 64 QAM).

If the SNRest is at least equal to the ideal signal-to-noise ratio (SNRest≧SNRnideal) then the equalizer 10 is properly converged. Proper convergence is defined as an equalizer that is operating at or below the desired BER for the QAM index. This relationship is shown in the graphs of FIG. 3 that illustrates as SNR increases, BER decreases for a given QAM index.

For example, if the equalizer 10 is operating with 64 QAM signals an objective BER is selected at $10^{-7}$ (BERobj= $10^{-7}$). Based on the 64 QAM BER vs. SNR curve shown in the graph of FIG. 3 and Table A1, the SNRnideal would be approximately 27 dB (SNRnideal=27 dB). The SNR is estimated using equation Eq. 1. If SNRest is larger than or equal to 27 dB then the equalizer 10 is converged properly. However, if SNRest falls below 27 dB then the equalizer 10 is not operating properly for 64 QAM signalling and a lower QAM index is selected, such as 16 QAM.

Figure 4:
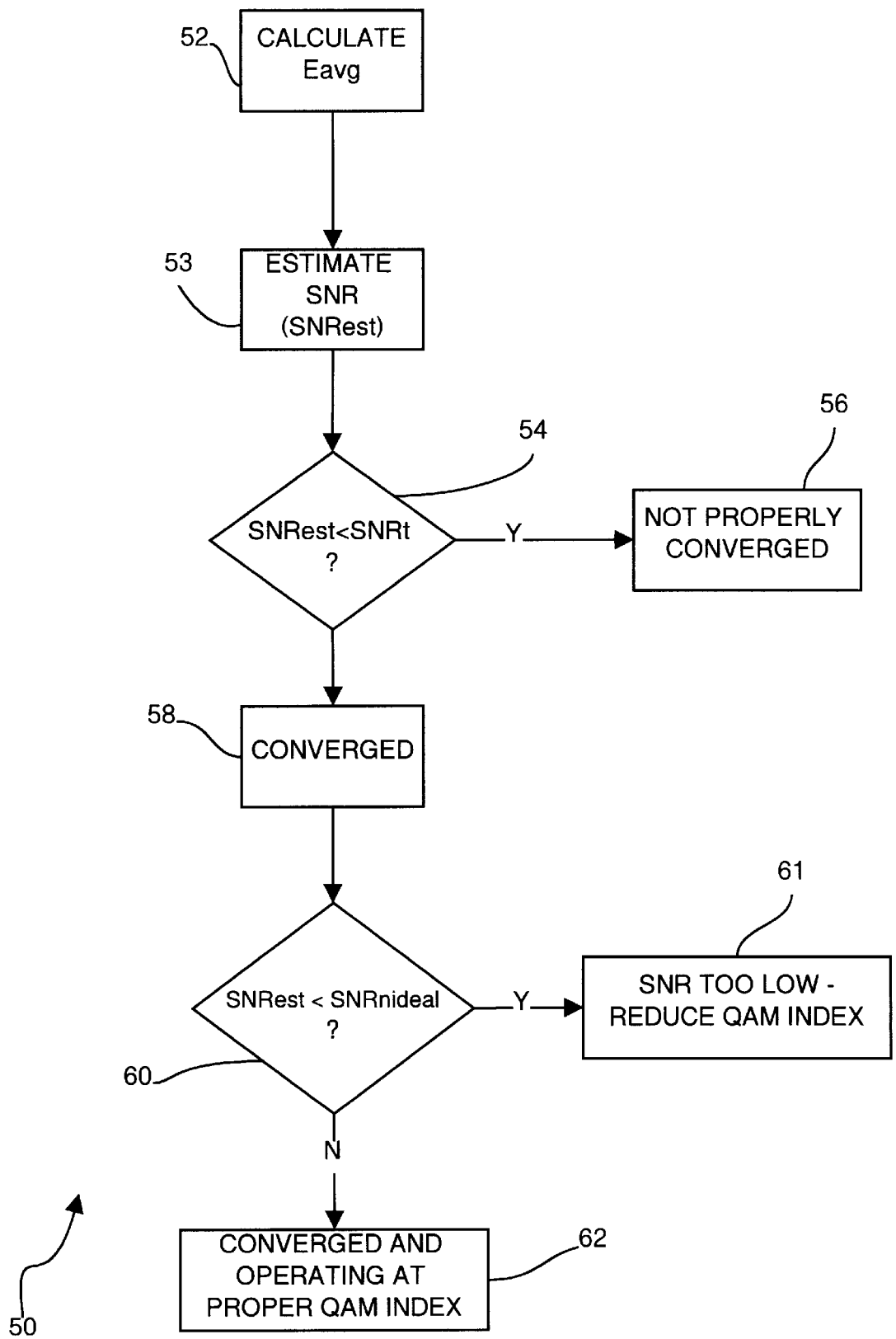
FIG. 4 illustrates a flow chart of the method of SNR estimation, proper convergence detection and operating QAM index adjustment according to the present invention.

A method of proper convergence detection 50 is illustrated in the flow chart of FIG. 4. At step 52 an average output error (Eavg) of the equalizer 10 is calculated. Based on the average output error Eavg the SNR of the equalizer 10 is estimated (SNRest) at step 53.

The estimated SNR (SNRest) is compared to an predetermined SNR threshold (SNRt) based on a minimal operating SNR for the lowest supported QAM index (e.g. 4 QAM) at step 54. If SNRest is below the SNR threshold (SNRest<SNRt) then the equalizer 10 has not properly converged at step 56 (i.e. either signalling misconvergence or convergence but at an unusable SNR). If the SNRest is larger than or equal to the SNR threshold (SNRest≧SNRt) then convergence of the equalizer 10 is declared at step 58 and processing continues to a second decision block 60.

The estimated SNR is compared to an ideal SNR (SNRnideal) at step 60. The SNRnideal value is based on an objective BER for a given QAM index. If the SNRest is below the ideal SNR (SNRest<SNRnideal) then poor performance of the equalizer 10 is declared (i.e. SNRest is too low) at step 61 for a given QAM index and a lower QAM index is selected for further equalizer 10 operation.

If the SNRest is at least equal to the ideal SNR (SNRest≧SNRnideal) then proper converged performance of the equalizer 10 is declared for a given QAM index at step 62. When step 62 is reached the equalizer 10 is converged and is operating at or below an objective BER for the operating QAM index.

In summary, the threshold SNR (SNRt) is set to a level to detect misconvergence in the equalizer 10 at a lowest QAM index (e.g. 4 QAM), and the ideal SNR (SNRnideal) is based on an objective BER for a given QAM index to determine if a converged equalizer is operating at the proper (low error) QAM index level.

What is claimed is:

1. A method of convergence monitoring in an adaptive decision feedback equalizer having a quadrature amplitude modulation (QAM) slicer receiving as input a complex input signal, comprising the steps of:

(a) calculating an average output error of the equalizer by calculating a difference of the complex input signal having an in-phase component and a quadrature component before and after the QAM slicer, adding an absolute value of the in-phase component of the input signal to an absolute value of the quadrature component of the input signal to obtain a sum of the error components, and integrating the sum of the error components over a prescribed time;

(b) estimating a signal-to-noise ratio (SNR) based on the average output error; and (c) comparing the estimated SNR to an SNR threshold, wherein the equalizer is not properly converged when the estimated SNR is lower than the SNR threshold.

2. The method as claimed in claim 1, further comprising, when the estimated SNR is at least equal to the SNR threshold, comparing the estimated SNR to an ideal SNR based on an objective bit error rate for a prescribed QAM index, and reconverging the equalizer at a QAM index lower than the prescribed QAM index when the estimated SNR is lower than the ideal SNR.

3. The method as claimed in claim 2, wherein the estimated SNR is determined by the following equation:

$$SNR = k_n - 20 \log_{10}(Eavg)$$

where $k_n$ is a constant based on a QAM index n and Eavg is the average output error of the equalizer.

4. The method as claimed in claim 3, wherein the SNR threshold is set at a minimal operating SNR for a lowest operating QAM index of the equalizer.

5. A method of operating an adaptive decision feedback equalizer having an average output error, comprising the steps of:

(a) estimating a signal-to-noise ratio (SNR) based on the average output error by calculating a difference of a complex input signal having an in-phase component and a quadrature component before and after a QAM slicer; adding an absolute value of the in-phase component of the input signal to an absolute value of the quadrature component of the input signal to obtain a sum of the error components; and integrating the sum of the error components over a prescribed time; and (b) comparing the estimated SNR to an ideal SNR based on an objective bit error rate for a prescribed QAM index, and reconverging the equalizer at a QAM index lower than the prescribed QAM index when the estimated SNR is lower than the ideal SNR.

6. The method as claimed in claim 5, wherein the estimated SNR is determined by the following equation:

$$SNR = k_n - 20 \log_{10}(Eavg)$$

where $k_n$ is a constant based on a QAM index n and Eavg is the average output error of the equalizer.

7. A method of estimating signal-to-noise ratio at an output of an adaptive decision feedback equalizer receiving an input signal, comprising:

(a) calculating an average output error of the equalizer by calculating a difference of a complex input signal having an in-phase component and a quadrature component before and after a QAM slicer; adding an absolute value of the in-phase component of the input signal to an absolute value of the quadrature component of the input signal to obtain a sum of the error components; and integrating the sum of the error components over a prescribed time; and (b) estimating the signal-to-noise ratio (SNRest) where, $$SNRest = k_n - 20 \log_{10}(Eavg)$$

where $k_n$ is a constant based on a QAM index n and Eavg is the average output error of the equalizer.

8. An apparatus for convergence monitoring in an adaptive decision feedback equalizer having a quadrature amplitude modulation (QAM) slicer receiving as input a complex input signal having an in-phase and a quadrature component, comprising the steps of:

(a) means for calculating an average output error of the equalizer using means for subtracting output of the QAM slicer from input to the QAM slicer, an adder for adding an absolute value of the in-phase component of the input signal to the absolute value of the quadrature component of the input signal to obtain a sum of error components, and an integrator for integrating the sum of the error components over a prescribed time;

(b) means for estimating a signal-to-noise ratio (SNR) based on the average output error; and (c) a comparator for comparing the estimated SNR to an SNR threshold, wherein the equalizer is improperly converged when the estimated SNR is below the SNR threshold.

9. The apparatus as claimed in claim 8, wherein the comparator includes means for comparing the estimated SNR to an ideal SNR based on an objective bit error rate for a prescribed QAM index, and reconverging the equalizer at a QAM index lower than the prescribed QAM index when the estimated SNR is lower than the ideal SNR and the estimated SNR is at least equal to the SNR threshold.

10. The apparatus as claimed in claim 9, wherein the integrator includes a low pass filter.

11. The apparatus as claimed in claim 8, wherein the SNR is determined by the following equation:

$$SNR = k_n - 20 \log_{10}(Eavg)$$

where $k_n$ is a constant based on a QAM index n and Eavg is the average output error of the equalizer.

* * * * *